US011978338B2

(12) United States Patent
Qi

(10) Patent No.: US 11,978,338 B2
(45) Date of Patent: May 7, 2024

(54) INTERSECTION DEADLOCK IDENTIFICATION METHOD FOR MIXED AUTONOMOUS VEHICLES FLOW

(71) Applicant: ZHEJIANG UNIVERSITY, Zhejiang (CN)

(72) Inventor: Hongsheng Qi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 147 days.

(21) Appl. No.: 17/483,733

(22) Filed: Sep. 23, 2021

(65) Prior Publication Data

US 2023/0068181 A1 Mar. 2, 2023

(30) Foreign Application Priority Data

Jul. 23, 2021 (CN) ......................... 202110837483.0

(51) Int. Cl.

*G08G 1/01* (2006.01)
*G08G 1/015* (2006.01)
*G08G 1/052* (2006.01)

(52) U.S. Cl.

CPC ......... *G08G 1/0133* (2013.01); *G08G 1/0145* (2013.01); *G08G 1/015* (2013.01); *G08G 1/052* (2013.01)

(58) Field of Classification Search

CPC .. G08G 1/0112; G08G 1/0133; G08G 1/0129; G08G 1/096775; G08G 1/0141; G08G 1/096716; G08G 1/0116; G08G 1/096741; G08G 1/096844; G08G 1/166; G08G 1/0145; G08G 1/0104; G08G 1/096827; G08G 1/04; G08G 1/012; G08G 1/052; G08G 1/096811; G08G 1/164; G08G 1/163; G08G 1/096725; G08G 1/167; G08G 1/096783; G08G 1/08; G08G 1/161; G08G 1/096791; G08G 1/07; G08G 1/20; G08G 1/0125; G08G 1/00; G08G 1/0962; G08G 1/0968; G08G 1/096816; G08G 1/165; G08G 1/09675; G08G 1/096838; G08G 1/096758; G08G 1/0969; G08G 1/095; G08G 1/01; G08G 1/093; G08G 1/081; G08G 1/096861; G08G 1/096872; G08G 1/0967; G08G 1/207; G08G 1/162;

(Continued)

(56) References Cited

U.S. PATENT DOCUMENTS

2007/0203638 A1 * 8/2007 Tooyama ........... G01C 21/3694 340/995.13

* cited by examiner

*Primary Examiner* — Maceeh Anwari
*Assistant Examiner* — Aarron E Santos
(74) *Attorney, Agent, or Firm* — W&G Law Group

(57) ABSTRACT

Provided is an intersection deadlock identification method for a mixed flow of autonomous vehicles. This method considers the reality that the intersection traffic flow is composed of human driven vehicles and connected autonomous vehicles. Firstly, the two-dimensional coordinates, speed and front wheel steering angle information of all vehicles in the intersection are obtained, and the blockage graph of vehicles is constructed on the assumption that the front wheel steering angles of all vehicles are fixed. If there is no ring structure in the blockage graph, there is no deadlock; if there is a ring structure, the evasion distance propagation algorithm is used to calculate the evasion requirement distance of a vehicle in the ring. When the evasion requirement distance is greater than the permitted travelling distance of the vehicle itself, a weak traffic deadlock exists.

5 Claims, 4 Drawing Sheets

(58) Field of Classification Search
CPC ........ G08G 1/005; G08G 1/056; G08G 1/065; G08G 1/0137; G08G 1/096883; G08G 1/202; G08G 1/087; G08G 1/092; G08G 1/09626; G08G 1/16; G08G 1/09; G08G 1/096708; G08G 1/14; G08G 1/083; G08G 1/091; G08G 1/205; G08G 1/096866; G08G 1/096888; G08G 1/017; G08G 1/082; G08G 1/0965; G08G 1/096833; G08G 1/22; G08G 1/123; G08G 1/168; G08G 1/0175; G08G 1/042; G08G 1/096822; G08G 1/048; G08G 1/096805; G08G 5/0043; G08G 1/0108; G08G 1/096; G08G 1/127; G08G 1/015; G08G 1/13; G08G 1/09623; G08G 5/0065; G08G 1/143; G08G 1/09685; G08G 1/096894; G08G 1/146; G08G 9/00; G08G 1/137; G08G 1/141; G08G 1/148; G08G 5/0026; G08G 5/0034; G08G 5/0069; G08G 1/02; G08G 1/097; G08G 1/145; G08G 1/147; G08G 1/149; G08G 5/0013; G08G 5/06; G08G 1/096733; G08G 1/144; G08G 3/02; G08G 5/0021; G08G 1/094; G08G 1/142; G08G 5/0008; G08G 5/0039; G08G 5/0078; G08G 5/0091; G08G 5/0095; G08G 7/00; G08G 1/075; G08G 1/096855; G08G 5/003; G08G 5/0056; G08G 5/065; G08G 9/02
See application file for complete search history.

INTERSECTION DEADLOCK IDENTIFICATION METHOD FOR MIXED AUTONOMOUS VEHICLES FLOW

CROSS-REFERENCE TO RELATED APPLICATIONS

The present application claims priority to Chinese Patent Application No. 202110837483.0, filed on Jul. 23, 2021, the content of which is incorporated herein by reference in its entirety.

TECHNICAL FIELD

The present application relates to a technology for detecting a traffic deadlock in an intersection for an environment of a mixed flow of autonomous vehicles. Particularly, it relates to a technology for detecting whether a traffic deadlock is formed in the intersection when the traffic flow at the intersection is composed of a mixture of human driven vehicles (HDVs) and connected autonomous vehicles (CAVs) that no vehicle can leave.

BACKGROUND

Autonomous driving is becoming more and more popular. The composition of a road traffic flow gradually transits from fully human driven vehicles to a mixed state (a mixture of human driven vehicles and autonomous vehicles) and then to a complete traffic flow of autonomous vehicles. In the foreseeable future, human driven vehicles will still occupy a part of the road traffic flow.

Intersection deadlock is a special traffic state at the intersection. In the state of a traffic deadlock, each traffic flow blocks each other in the intersection, and the blocked traffic flow forms a ring structure. Any single vehicle is blocked by a downstream traffic, and the upstream vehicle is blocked at the same time. This jam acts on the vehicle itself via the ring structure, so that the vehicle itself cannot leave. Therefore, the traffic deadlock is self-locking.

Unlike a common traffic jam, a traffic deadlock cannot be solved by itself. Usually, manual intervention is a necessary condition for unlocking the traffic deadlock. The unlocking time depends on manual experience. Therefore, a traffic deadlock not only wastes time and resources, but also consumes human resources.

With the development of connected autonomous driving technology, CAVs are becoming more and more popular. Unlike a human driven vehicle, when a CAV is caught in a traffic deadlock, it is not aware of the traffic deadlock, so it can only wait indefinitely. Therefore, it is necessary to build a traffic deadlock identification method for the traffic flow environment of mixed connected autonomous driving.

SUMMARY

In order to fill the gap of the current intersection traffic deadlock identification technology, the present application provides a method for detecting a traffic deadlock occurring in an intersection for a mixed flow of autonomous vehicles. According to the present application, traffic deadlocks in an intersection are divided into two categories: weak traffic deadlocks and strong traffic deadlocks. The weak traffic deadlock is involved in the situation that the steering angle of the vehicle is given and fixed, and the strong traffic deadlock is involved in the situation that the steering angle of the vehicle is variable (that is, free steering is possible).

The results of traffic deadlock recognition are as follows: (1) there is no traffic deadlock; (2) there is only a weak traffic deadlock and no strong traffic deadlock; (3) there is a strong traffic deadlock.

The method is mainly realized by the following steps:

Step 1: first, the information (two-dimensional coordinates, speed, front wheel steering angle) of all connected autonomous vehicles and the information (two-dimensional coordinates, speed) of human driven vehicles in the intersection are obtained, and the front wheel steering angle of a human driven vehicle is estimated by an extended Kalman filter;

Step 2: first, a weak traffic deadlock is identified; if a weak traffic deadlock does not exist, the process ends and the identification result of "no traffic deadlock exists" is output; if the weak traffic deadlock exists, proceed to the step 3 to identify the strong traffic deadlock.

Step 3, if a strong traffic deadlock exists, a "strong traffic deadlock result" is output; otherwise, the detection result of "only a weak traffic deadlock exists and no strong traffic deadlock exists" is output.

The present application has the beneficial effects that:

1) by considering the mixed traffic flow of autonomous vehicles, it has wide applicability;

2) the traffic deadlock identification method is proposed for the first time, which fills the technical gap.

DESCRIPTION OF EMBODIMENTS

The present application will be further described in detail with reference to the accompanying drawings.

At present, CAVs are widely used and has a higher market share. Unlike human driven vehicles (HDVs), CAVs rely on vehicle-mounted detectors to detect the surrounding environment and make trajectory planning and decisions. When a human driven vehicle is caught in a traffic deadlock, the driver can observe the environmental traffic flow, coordinate with each other and finally unlock the traffic deadlock. However, when a CAV is caught in traffic deadlock, the CAV can only wait indefinitely without cooperative traffic deadlock detection strategy. Therefore, it is necessary to develop a traffic deadlock identification method in mixed autonomous vehicle environment. The input of the traffic deadlock algorithm is the information of mixed autonomous vehicles (including the information directly reported by the CAV and the information inferred from the HDV), and the output is the existence of a traffic deadlock.

Figure 1:
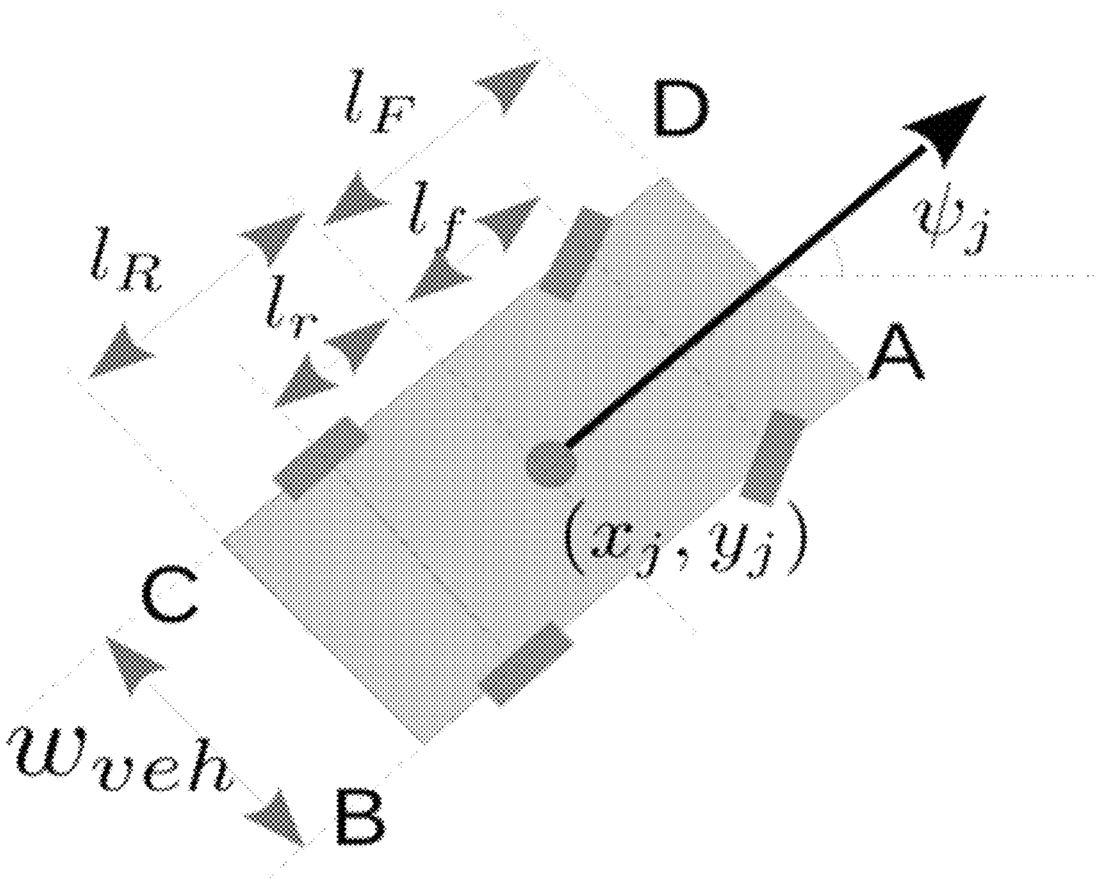
FIG. 1 Vehicle dynamics model.

In a traffic deadlock, vehicles block each other and form a ring structure. In order to clarify the traffic deadlock conditions, it is necessary to define the traffic jam first. A vehicle jam state refers to the state in which vehicles block each other under the dynamic constraints of vehicles. The schematic diagram of the dynamic model of the vehicle is shown in FIG. 1. The state parameter of the vehicle is $z=[x, y, \psi]^T$, and the control input is $u=[v, \delta^f]^T$, where v is speed, $\delta^f$ is thesteering angle of a front wheel (i.e. the angle between the front wheels of the vehicle and the longitudinal central axis of the vehicle), x and y represent the coordinates of the center of gravity of the vehicle, $\psi$ is the heading angle of the vehicle (i.e. the angle between the heading direction of the vehicle and the x axis). When a particular vehicle j is considered, the state vector is expressed as $z_j=[x_j, y_j, \psi_j]^T$. The distances between the center of gravity and the front and rear axles are $l_f$ and $l_r$ respectively, and the distances between the center of gravity and the front and rear bumpers are $l_F$ and $l_R$ respectively. The width of the vehicle is $w_{veh}$, and the length of the vehicle is $l_{veh}=l_R+l_F$. The dynamic model of the vehicle can be expressed by formula (1). The expression of the parameters $\beta$ is shown in formula (2).

$$\dot{z}=f(z,u):\begin{cases}\dot{x}=v\cos(\psi+\beta) & (a)\\ \dot{y}=v\sin(\psi+\beta) & (b)\\ \dot{\psi}=\frac{v\cos(\beta)}{l_f+l_r}\left(\tan\left(\delta^f\right)\right) & (c)\end{cases} \tag{1}$$

$$\beta=\tan^{-1}\left(\frac{l_r\tan\delta^f}{l_f+l_r}\right) \tag{2}$$

Given the geometric parameters of the vehicle, the coordinate expressions of A-D in four corners (FIG. 1) are shown in Formula (3).

$$\begin{cases}x^A=x+l_F\cos(\psi)+\frac{w_{veh}}{2}\cos\left(\psi-\frac{\pi}{2}\right);y^D=y+l_F\sin(\psi)+\frac{w_{veh}}{2}\sin\left(\psi-\frac{\pi}{2}\right);\\ x^B=x-l_R\cos(\psi)+\frac{w_{veh}}{2}\cos\left(\psi-\frac{\pi}{2}\right);y^B=y-l_R\sin(\psi)+\frac{w_{veh}}{2}\sin\left(\psi-\frac{\pi}{2}\right);\\ x^C=x-l_R\cos(\psi)+\frac{w_{veh}}{2}\cos\left(\frac{\pi}{2}+\psi\right);y^C=y-l_R\sin(\psi)+\frac{w_{veh}}{2}\sin\left(\frac{\pi}{2}+\psi\right);\\ x^D=x+l_F\cos(\psi)+\frac{w_{veh}}{2}\cos\left(\frac{\pi}{2}+\psi\right);y^D=y+l_F\sin(\psi)+\frac{w_{veh}}{2}\sin\left(\frac{\pi}{2}+\psi\right);\end{cases}$$

The coordinate of the longitudinal middle line of the vehicle is expressed as: $(x+\rho\cos(\psi), y+\rho\sin(\psi))$, $\rho\in[-l_R, l_F]$, different values of the variable $\rho$ correspond to different points on the central line, from the midpoint of the rear edge to the midpoint of the front edge. When $\rho=-l_R$, it corresponds to the midpoint of the rear bumper of the vehicle; when $\rho=-l_F$, it corresponds to the midpoint of the front bumper of the vehicle.

When the speed v and steering angle $\delta^f$ of the vehicle are fixed, according to the dynamic model formula (1), the function of the vehicle heading angle changing with time can be obtained as follows:

$$\psi(t)=t\frac{v\cos(\beta)\tan\left(\delta^f\right)}{l_f+l_r} \tag{3}$$

Therefore, the relationship between x coordinate and time can be obtained:

$$\begin{aligned}x(t)&=x(0)+\int_0^t v\cdot\cos(\psi(\varrho)+\beta)d\varrho\\ &=x(0)+v\int_0^t\cos\left(\varrho\frac{v\cos(\beta)\tan\left(\delta^f\right)}{l_f+l_r}+\beta\right)d\varrho\\ &=x(0)+\frac{l_f+l_r}{\cos(\beta)\tan\left(\delta^f\right)}\sin\left(t\frac{v\cos(\beta)\tan\left(\delta^f\right)}{l_f+l_r}+\beta\right)\end{aligned} \tag{4}$$

According to the above formula, t is expressed as a function of x:

$$t=\frac{l_f+l_r}{v\cdot\cos(\beta)\tan(\delta_f)}\left[\arcsin\left(\frac{(x-x(0))\cdot\cos(\beta)\tan\left(\delta^f\right)}{l_f+l_r}\right)-\beta\right] \tag{5}$$

On the other hand, it can be obtained that the derivative of the space curve of the trajectory through which the center of gravity of the vehicle passes is:

$$\frac{dy}{dx}=\frac{dy/dt}{dx/dt}=\frac{\dot{y}}{\dot{x}}=\tan(\psi+\beta)=\tan\left(t\frac{v\cos(\beta)\tan\left(\delta^f\right)}{l_f+l_r}+\beta\right) \tag{6}$$

Therefore, by combining formulas (6) and (7), we can get the derivative expression of the space trajectory of the center of gravity of the vehicle when the vehicle speed and steering angle are fixed:

$$\frac{dy}{dx}=\tan\left(\arcsin\left(\frac{(x-x(0))\cdot\cos(\beta)\tan\left(\delta^f\right)}{l_f+l_r}\right)\right)=\tan\left(\arcsin\left(\frac{(x-x(0))\cdot\cos\left(\tan^{-1}\left(\frac{l_r\tan\delta^f}{l_f+l_r}\right)\right)\tan\left(\delta^f\right)}{l_f+l_r}\right)\right) \tag{7}$$

Therefore, the space trajectory curve of the center of gravity can be obtained as follows:

$$y=y(0)+\int_0^x\tan\left(\arcsin\left(\frac{(\varrho--x(0))\cdot\cos(\beta)\tan(\delta_f)}{l_f+l_r}\right)\right)d\varrho \tag{8}$$

For convenience, the above formula is expressed as $y=\mathcal{F}(x)$.

Figure 2:
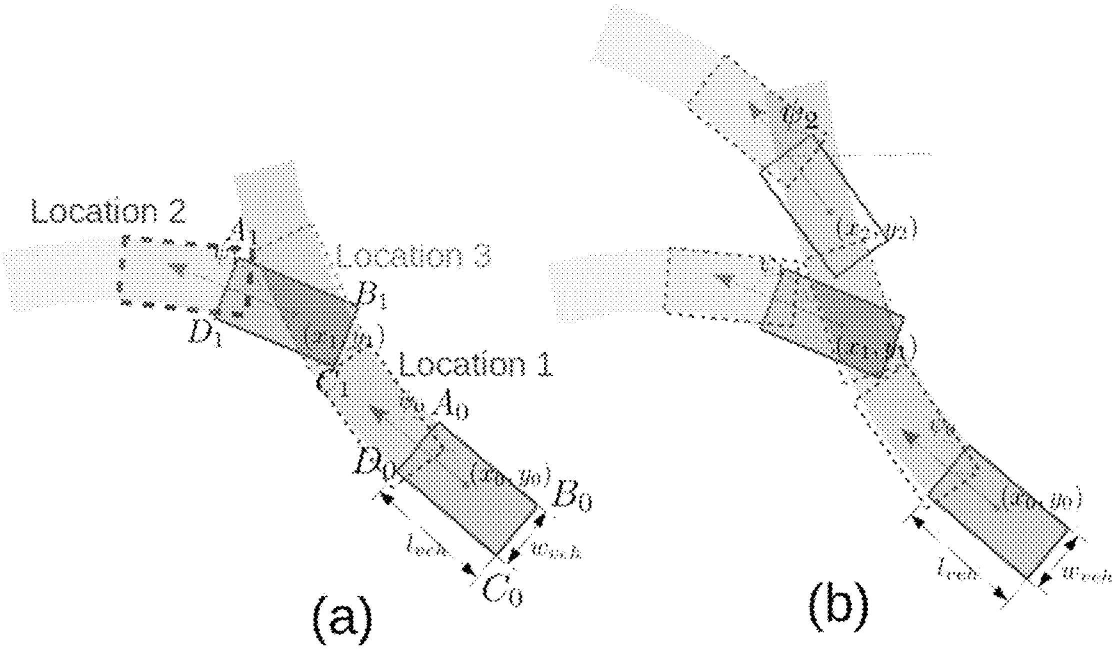
FIG. 2 Blockage state among vehicles; (a) between two vehicles; (b) between multiple vehicles.

Under the constraint of a dynamic model, assuming that the front wheel deflection angle $\delta^f$ is fixed, the blockage state between vehicles is shown in FIG. 2. FIG. 2-*a* shows that vehicle 0 is blocked by vehicle 1. FIG. 2-*b* shows that vehicle 0 is blocked by multiple vehicles. The existence of a traffic jam indicates that one vehicle is on the track of another.

For vehicles 0 and 1 in FIG. 2-*a*, vehicle 0 is a blocked vehicle and vehicle 1 is a blocking vehicle. Therefore, the contour of the vehicle 1 coincides with the contour corresponding to a certain point on the trajectory of the vehicle 0. Assuming that the four corners of vehicle 0 are $A_0$, $B_0$, $C_0$ and $D_0$, and the contours of the vehicles coincide when the following conditions are met:

$$S_{\Delta A_0A_1B_1}+S_{\Delta A_0B_1C_1}+S_{\Delta A_0C_1D_1}+S_{\Delta A_0D_1A_1}\geq S_{\Delta A_1B_1C_1D_1}=w_{veh}(l_F+l_R) \tag{9}$$

where $S_{\Delta A_0A_1B_1}$ represents the area of the triangle $\Delta A_0A_1B_1$ which is a triangle composed of points $A_0$, $A_1$ and $B_1$, and the same is true for others. The trajectory of vehicle 0 can be obtained by formula (9), and whether the vehicle 1 blocks the vehicle 0 or whether the vehicle 1 is located on the track of the vehicle 0 can be judged by the condition (10). For the case that one vehicle is blocked by multiple vehicles, as shown in FIG. 2-*b*, it is necessary to judge the blocking relationship between vehicles 1, 2 and 0.

Because of the blocking relationship between vehicles, the distance that blocked vehicles can travel depends on the behavior of blocking vehicles. Take FIG. 2-*a* as an example to describe the travelling distance of the vehicle in the blocked state. Three quantities are defined: (permitted travelling distance) $\widehat{l_{0\to 1}}$, evasion condition $\underline{l_{1\leftarrow 0}}$, and evasion distance $\overline{l_{0\to 1}}$. The permitted travelling distance $\widehat{l_{0\to 1}}$ indicates the distance that the vehicle 0 can travel at most because the vehicle 1 exists and does not move (locationl in FIG. 2-*a*). The evasion condition $\underline{l_{1\leftarrow 0}}$ refers to the distance (location 2 in FIG. 2-*a*) that the vehicle 1 needs to travel, so that the vehicle 0 will not be constrained by the vehicle 1. The evasion distance $\overline{l_{0\to 1}}$ refers to the maximum distance traveled by vehicle 0 before escaping (location 3 in FIG. 2-*a*). First, look at the calculation method of the permitted travelling distance. Obviously, if the distance traveled by the vehicle 0 is equal to the permitted travelling distance, the contours of the vehicle 0 and the vehicle 1 are just in contact. Assuming that the coordinate of the center of gravity of vehicle 0 when the contour of vehicle 1 just touches the contour of vehicle 0 is $(x_0^*, y_0^*)$, the coordinate solving method is expressed as the following optimization problem:

$$(x_0^*, y_0^*) = \underset{x_0}{\operatorname{argmin}}\left(\sqrt{\begin{matrix}(x_1+\rho_1\cos(\psi_1)-x_0-\rho_0\cos(\psi_0))^2+\\(y_1+\rho_1\sin(\psi_1)-y_0(t)+\rho_0\sin(\psi_0))^2\end{matrix}}-w_{veh}\right)^2 \tag{10}$$

where $\rho\in[-l_R, l_F]$. Therefore, in combination with (7), the calculation of the permitted travelling distance is the following integral:

$$\widehat{l_{0\to 1}} = k(x_0^*) = \int_{x_0}^{x_0^*}\sqrt{1+\left(\tan\left(\arcsin\left(\frac{\varrho\cdot\cos(\beta)\tan(\delta_f)}{l_f+l_r}\right)\right)\right)^2}\,d\varrho \tag{11}$$

For the evasion condition $\underline{l_{1\leftarrow 0}}$, assuming that the coordinate of the center of gravity of the vehicle 1 after driving this distance is $(x_1^*, y_1^*)$, the solution method of the coordinate is as follows:

$$(x_1^*, y_1^*) = \underset{x_0,x_1}{\operatorname{argmin}}\left(\min_{\rho_1,\rho_2\in[-l_R,l_F]}\left\|\begin{bmatrix}x_1+\rho_1\cos(\psi_1)\\y_1+\rho_1\sin(\psi_1)\end{bmatrix}-\begin{bmatrix}x_0(t)+\rho_0\cos(\psi_0)\\y_0(t)+\rho_0\sin(\psi_0)\end{bmatrix}\right\|-w_{veh}-\xi\right)^2 \tag{12}$$
$$\text{s.t.}\begin{cases}y_0=\mathcal{F}(x_0)\\y_1=\mathcal{F}(x_1)\end{cases}$$

$\xi$ is a very small positive number, and can take a value $w_{veh}/10$. The physical meaning of the above optimization problem is to solve the position of the vehicle 1 when the minimum distance between the two vehicle contours is $w_{veh}+\xi$. When the vehicle 1 is still blocking the vehicle 0, it is obvious that the minimum distance is $w_{veh}$. Therefore, $\xi$ ensures that the vehicle 1 is not on the track of the vehicle 0 and is very close to the track of the vehicle 0. After solving $(x_1^*, y_1^*)$, the evasion condition $\underline{l_{1\leftarrow 0}}$ is calculated as the following integral:

$$\underline{l_{1\leftarrow 0}} = k(x_1^*) = \int_{x_1}^{x_1^*}\sqrt{1+\left(\tan\left(\arcsin\left(\frac{\varrho\cdot\cos(\beta)\tan(\delta_f)}{l_f+l_r}\right)\right)\right)^2}\,d\varrho \tag{14}$$

For the evasion distance $\overline{l_{0\to 1}}$, assuming that the coordinate of the center of gravity of vehicle 0 after driving this distance is $(x_0^{}, y_0^{})$, the coordinate is expressed as:

$$(x_0^{}, y_0^{}) = \underset{x_0}{\operatorname{argmin}}\left(\min_{\rho_1,\rho_2\in[-l_R,l_F]}\left\|\begin{bmatrix}x_1^*+\rho_1\cos(\psi_1^*)\\y_1^*+\rho_1\sin(\psi_1^*)\end{bmatrix}-\begin{bmatrix}x_0(t)+\rho_0\cos(\psi_0(t))\\y_0(t)+\rho_0\sin(\psi_0(t))\end{bmatrix}\right\|-w_{veh}\right)^2 \tag{13}$$
$$\text{s.t. } y_0=\mathcal{F}(x_0)$$
$$\text{s.t. } y_0=\mathcal{F}(x_0)$$

Therefore, the expression of the evasion distance $\overline{l_{0\to 1}}$ is:

$$\overline{l_{0\to 1}} = k(x_0^{}) = \int_{x_0}^{x_0^{}}\sqrt{1+\left(\tan\left(\arcsin\left(\frac{\varrho\cdot\cos(\beta)\tan(\delta_f)}{l_f+l_r}\right)\right)\right)^2}\,d\varrho \tag{16}$$

The above three distances (the permitted travelling distance $\mathcal{F}$, the evasion condition $\underline{l_{1\leftarrow 0}}$ and the evasion distance $\overline{l_{0\to 1}}$) are defined for the steering angle condition of the fixed front wheel.

In addition to the above three distances, a restriction function $l_1=\mathcal{L}_{0\to 1}(l_0)$ between vehicles is defined, that is, the evasion distance propagation algorithm, which expresses the distance that the vehicle 1 needs to travel in order to make the vehicle 0 move forward. Obviously, the domain of definition of this function is $[0,\overline{l_{0\to 1}}]$ and the range is $[0, \underline{l_{1\leftarrow 0}}]$. For convenience of description, when $l_0\le\overline{l_{0\to 1}}$, $\mathcal{L}_{0\to 0}(l_0)=0$, i.e., the vehicle 1 does not need to move, and the travelling distance of the vehicle 0 can be taken as $0\sim\overline{l_{0\to 1}}$. The calculation method of the function $l_1=\mathcal{L}_{0\to 1}(l_0)$ is similar to the calculation of the three distances: firstly, it is assumed that the travelling distance $l_1$ of vehicle 1 is fixed afterwards, and then the permitted travelling distance of vehicle 0 under this condition is solved, so that the relationship between $l_1$ and $l_0$ can be obtained.

Figure 3:
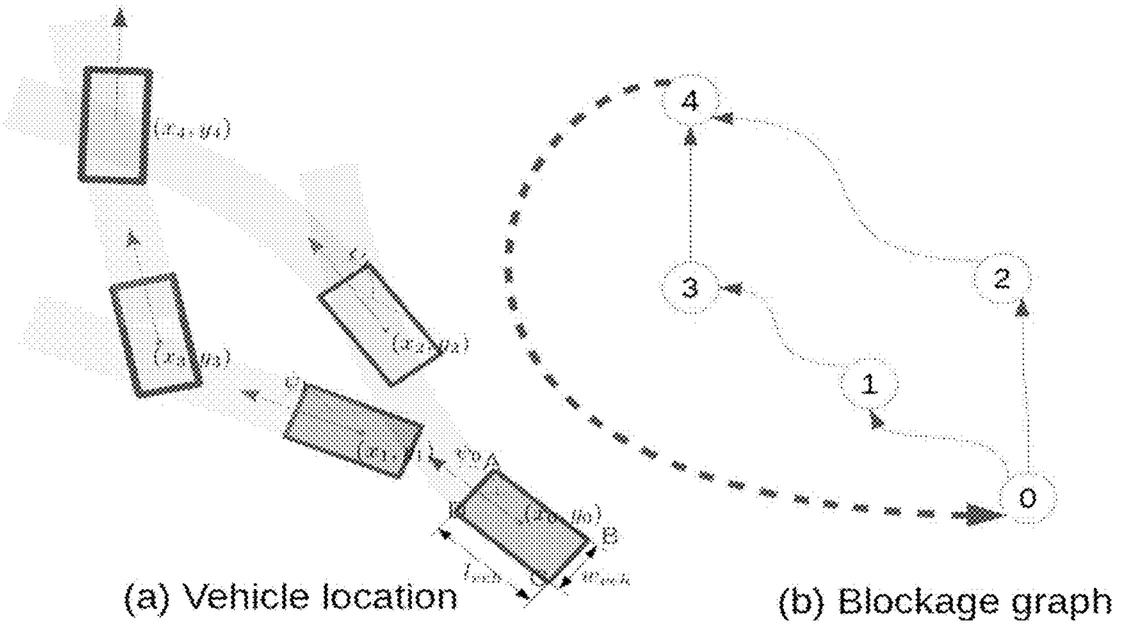
FIG. 3 block graph example.

Given the state of all vehicles in the intersection (the state vector $[x, y, \psi]^T$ and control vector $u=[v, \delta f]^T$ of each vehicle), whether the vehicles are blocked or not can be judged by formula (10). Therefore, each vehicle is expressed as a node, and the blocked vehicles are connected by edges, and the direction points from the blocked vehicles to the blocking vehicles. This graph is called blockage graph and is expressed by $BG(\mathfrak{N}, \mathfrak{E})$. $\mathfrak{N}=\{1, 2 \ldots\}$ is the set of vehicle and $\mathfrak{E}$ is the set of edges. The schematic diagram of BG(•,•) is shown in FIG. 3.

Obviously, when there is no cycle in BG(•,•), there is no weak traffic deadlock or strong traffic deadlock. If there is a cycle in BG(•,•), it is necessary to detect the existence of a traffic deadlock. Assuming that there is a cycle in BG(•,•), ($k^{th}$ cycle), and it is expressed as $\mathbb{L}_k$. $\mathbb{L}_k=\{1^{\mathbb{L}_k}, 2^{\mathbb{L}_k}, 3^{\mathbb{L}_k}\ldots\}$ represents a set of a series of nodes, that is, vehicles. These nodes form a cycle $\mathbb{L}$. $1^{\mathbb{L}_k}$ is the first node (or the first vehicle) of the cycle, $2^{\mathbb{L}_k}$ is the downstream vehicle of the vehicle $1^{\mathbb{L}_k}$, and blocks the vehicle $1^{\mathbb{L}_k}$. Without losing generality, the vehicle $1^{\mathbb{L}_k}$ is selected to define deadlock conditions. The evasion distance corresponding to this vehicle is $\overline{l_{1^{\mathbb{L}_k}\to 2^{\mathbb{L}_k}}}$, therefore, the distance that the vehicle $2^{\mathbb{L}_k}$ needs to travel is $\mathcal{L}_{1^{\mathbb{L}_k}\to 2^{\mathbb{L}_k}}(\overline{l_{1^{\mathbb{L}_k}\to 2^{\mathbb{L}_k}}})$, hence, the distance that the vehicle 3 needs to travel is:

$$\mathcal{L}_{2^{\mathbb{L}_k}\to 3^{\mathbb{L}_k}}\left(\mathcal{L}_{1^{\mathbb{L}_k}\to 2^{\mathbb{L}_k}}\left(\overline{l_{1^{\mathbb{L}_k}\to 2^{\mathbb{L}_k}}}\right)\right) \tag{14}$$

The above formula is expressed as $\lambda = \mathfrak{I}_{1^{\mathbb{L}_k}\rightsquigarrow 3^{\mathbb{L}_k},\mathbb{L}_k}(\eta)$, which indicates that the premise that the vehicle $1^{\mathbb{L}_k}$ travels the distance of $\eta$ is that the vehicle $3^{\mathbb{L}_k}$ travels the distance of $\lambda$. By analogy, it can be obtained that the distance that the vehicle $4^{\mathbb{L}_k}$ needs to travel is:

$$\mathcal{J}_{1^{\mathbb{L}_k}\to 4,\mathbb{L}_k}(\cdot) = \mathcal{L}_{3^{\mathbb{L}_k}\to 4^{\mathbb{L}_k}}\left(\mathcal{L}_{2^{\mathbb{L}_k}\to 3^{\mathbb{L}_k}}\left(\mathcal{L}_{1^{\mathbb{L}_k}\to 2^{\mathbb{L}_k}}\left(\overline{l_{1^{\mathbb{L}_k}\to 2^{\mathbb{L}_k}}}\right)\right)\right) \tag{15}$$

This relationship can be deduced iteratively along the cycle $\mathbb{L}$. Because of the cycle structure, the travelling distance requirement for the vehicle $1^{\mathbb{L}_k}$ itself is expressed as $\mathfrak{I}_{1^{\mathbb{L}_k}\rightsquigarrow 1^{\mathbb{L}_k},\mathbb{L}_k}(\overline{l_{1^{\mathbb{L}_k}\to 2^{\mathbb{L}_k}}})$. When the following conditions hold, the weak traffic deadlock exists:

$$\mathfrak{I}_{1^{\mathbb{L}_k}\rightsquigarrow 1^{\mathbb{L}_k},\mathbb{L}_k}\left(\overline{l_{1^{\mathbb{L}_k}\to 2^{\mathbb{L}_k}}}\right) > \widehat{l_{1^{\mathbb{L}_k}\to 2^{\mathbb{L}_k}}}$$

The physical meaning of the condition expressed by the above formula is that the vehicle $1^{\mathbb{L}_k}$ can escape only when the travelling distance is at least $\overline{l_{1^{\mathbb{L}_k}\to 2^{\mathbb{L}_k}}}$. The travelling distance requirement via the cycle $\mathbb{L}$ is $\mathfrak{I}_{1^{\mathbb{L}_k}\rightsquigarrow 1^{\mathbb{L}_k},\mathbb{L}_k}(\overline{l_{1^{\mathbb{L}_k}\to 2^{\mathbb{L}_k}}})$, which is greater than the distance $\widehat{l_{1^{\mathbb{L}_k}\to 2^{\mathbb{L}_k}}}$ that the current vehicle can move forward, which makes the evasion condition unsatisfied, so the whole cycle $\mathbb{L}$ forms a deadlock and no vehicle can escape.

The weak traffic deadlock detection process is carried out according to the above conditions (i.e., formula (19)). The detection process starts from a randomly selected vehicle in the ring, calculates the evasion distance, and further calculates the requirements of the travelling distance one by one along the ring, and finally compares it with its own permitted travelling distance. If condition (19) is satisfied, a weak traffic deadlock will occur. See the following table for detection process.

TABLE 1

| The procedure of weak deadlock detection | |
|---|---|
| Input | The information of all vehicles. It include the information of all CAVs and HDVs. The information of CAV are speed and front steering angle, while the information of the HDVs are real-time coordinates |
| output | weak deadlock set $\mathcal{D}$ |
| | The vehicles within deadlock |
| | Initialize deadlocks set $\mathcal{D} = \emptyset$ |
| | Estimate the speed and the steering angle of all HDVs; |
| | Construct the $BG(\mathfrak{N}, \mathfrak{E})$; |
| | IF loops exist in $BG(\mathfrak{N}, \mathfrak{E})$: |
| | Identify all loops in $BG(\mathfrak{N}, \mathfrak{E})$ as set $\mathcal{L} = \{\mathbb{L}_k\}$; |
| | FOR each loop $\mathbb{L}_k$ in $\mathcal{L}$: |
| | Randomly select one vehicle (say vehicle 1 without loss of generality) to check deadlock existence; |
| | Calculate $\overline{l_{1\to 2}}$ *and* $\widehat{l_{1\to 2}}$; |

TABLE 1-continued

| The procedure of weak deadlock detection |
|---|
| Calculate $\mathfrak{I}_{1\rightsquigarrow 1,\mathbb{L}_k}(\overline{l_{1\to 2}})$; |
| IF $\mathfrak{I}_{1\rightsquigarrow 1,\mathbb{L}_k}(\overline{l_{1\to 2}}) > \widehat{l_{1\to 2}}$ |
| $\mathcal{D} = \mathcal{D} \cup \{\mathbb{L}_k\}$; |
| RETURN $\mathcal{D}$ |
| ELSE |
| No deadlock is found; |
| RETURN $\mathcal{D}$; |

Figure 4:
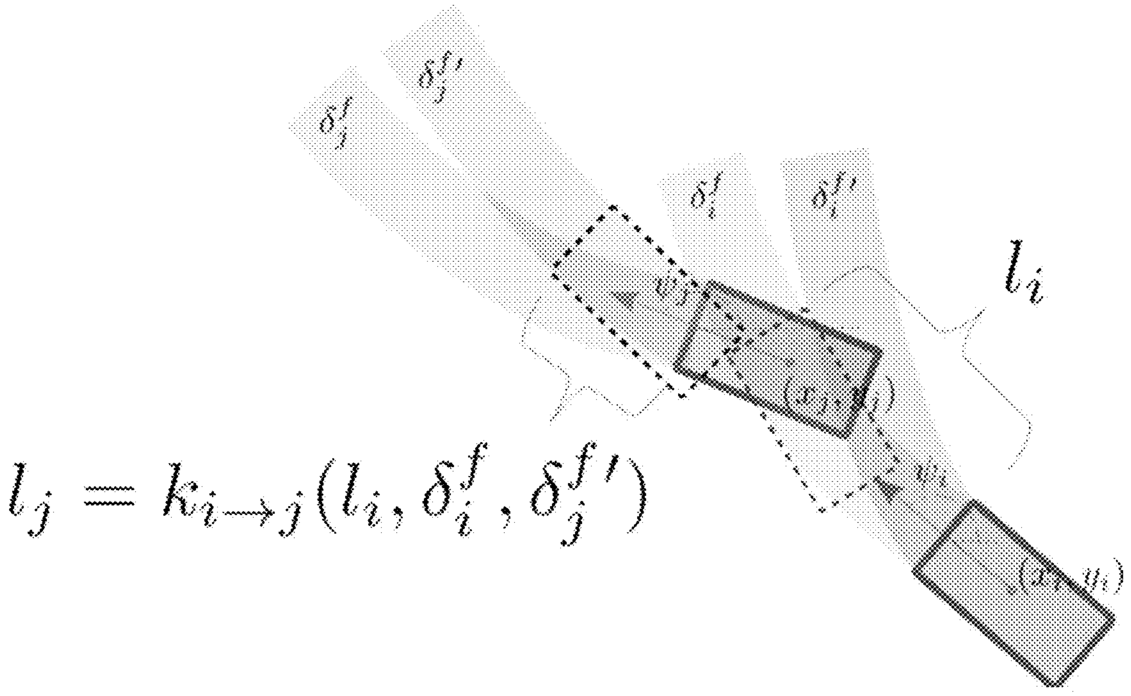
FIG. 4 Decision sequence construction.
Figure 5:
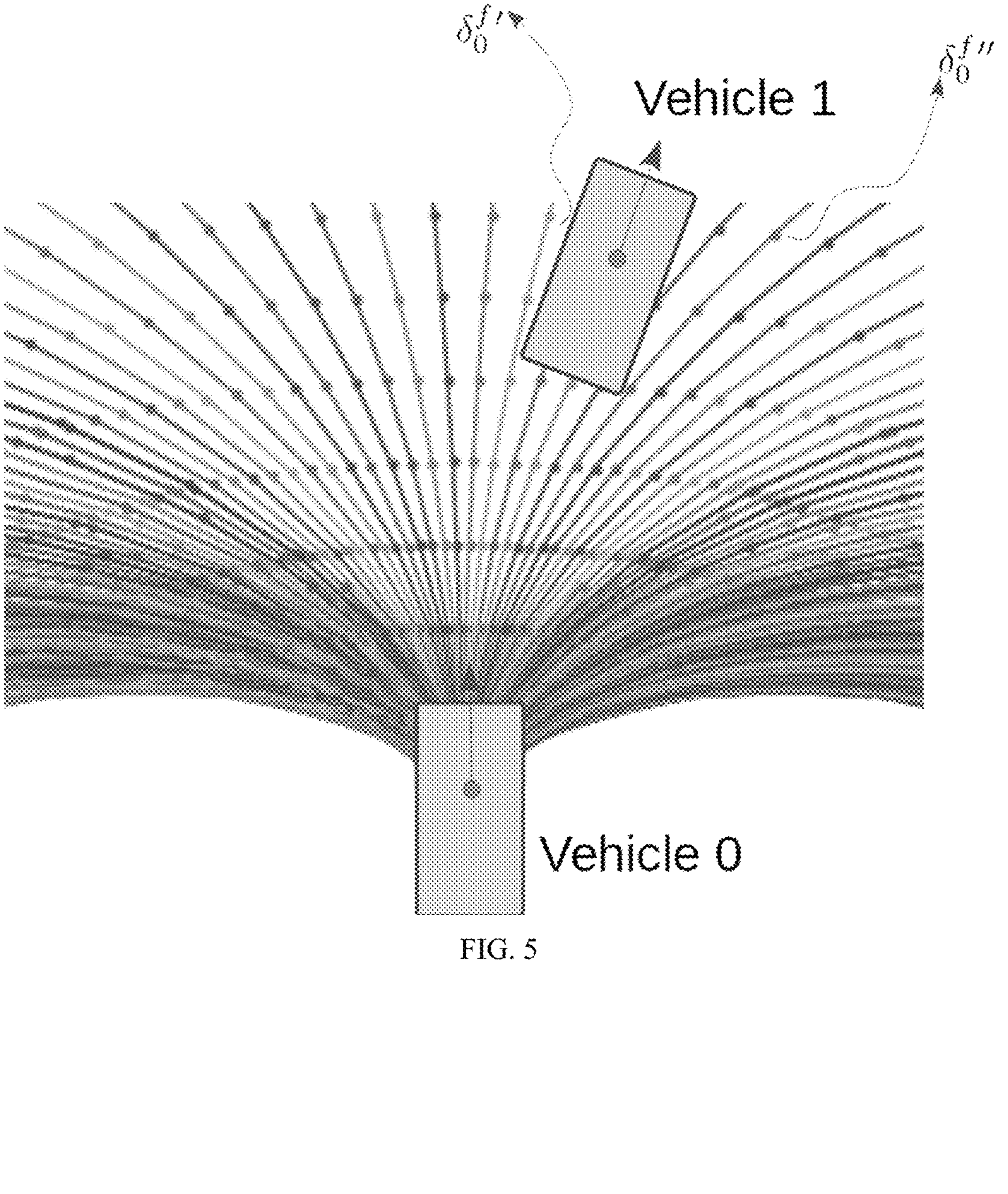
FIG. 5 Numerical solution to the extended blockade graphl Numerical solution to the extended blockage graph.

The premise of a weak traffic deadlock is that the steering angle of the front wheel is fixed. When a weak traffic deadlock occurs, a CAV can escape from the traffic deadlock by turning and changing its own direction. Therefore, it is necessary to check whether any steering angle condition always lead to a deadlock, that is, A strong traffic deadlock condition. The key difference between A strong traffic deadlock and A weak traffic deadlock is that the strong traffic deadlock needs to detect any possible steering angle of every CAV in the intersection. At this time, the restriction function between the two vehicles is expressed as $l_j = \mathcal{K}_{i\to j}(l_i, \delta_i^f, \delta_j^f)$. The schematic diagram is shown in FIG. 4. The vehicle i is blocked by the vehicle j. When the steering angle of vehicle i is $\delta_i^f$ and the steering angle of vehicle j is $\delta_j^f$, the corresponding restriction function is $l_j = \mathcal{K}_{i\to j}(l_i, \delta_i^f, \delta_j^f)$, indicating the distance that vehicle j needs to travel to provide space when vehicle i intends to move forward the distance $l_i$. The corresponding three distances are expressed as permitted travelling distance $\widehat{l_{i\to j}}|_{\delta_i^f}$, the evasion condition $\underline{l_{j\leftarrow i}}|_{\delta_i^f, \delta_j^f}$ and evasion distance $\overline{l_{i\to j}}|_{\delta_i^f,\delta_j^f}$. The subscript lists the steering angle of the blocked vehicle and the steering angle of the blocking vehicle respectively. The lower dashed outline in the figure is the terminal state of vehicle i after travelling distance $l_i$ with steering angle $\delta_i^f$. The outline of the upper dashed line is the terminal state of vehicle j after travelling the distance $l_j = \mathcal{K}_{i\to j}(l_i, \delta_i^f, \delta_j^{f'})$ to provide sufficient travel space for the vehicle i. FIG. 5

Figure 6:
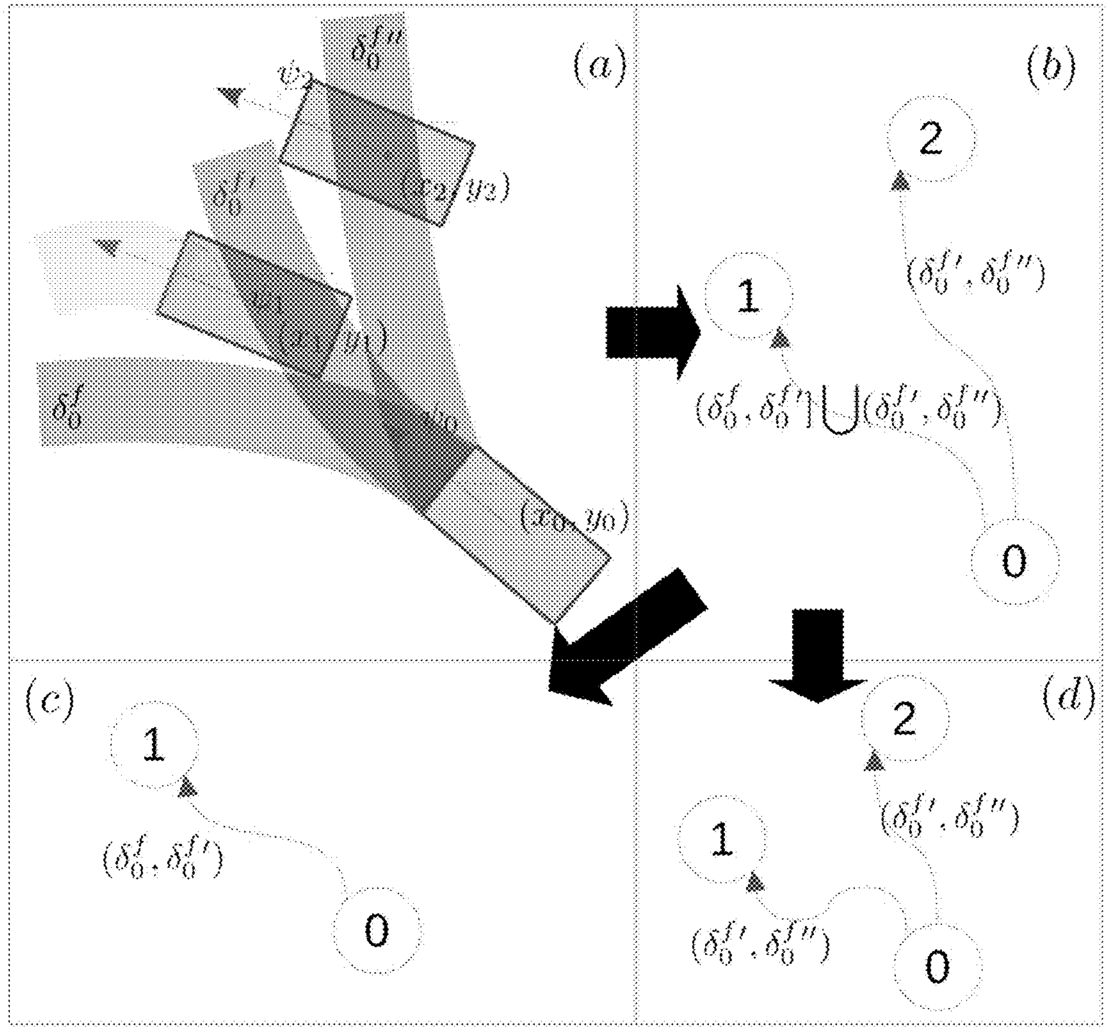
FIG. 6 Steering Angle Dependent Blockage Graph; (a) Vehicle state illustration; (b) vehicle relation; split the relation into several sub blockage graphs (c) and (d).

Similar to the detection of a weak traffic deadlock, a strong traffic deadlock needs to build a blockage graph, which is expressed as $\overleftrightarrow{BG}(\mathfrak{N}, \mathfrak{E} \mid \delta^f)$, which is called as an extend blockage graph. When the steering angle is variable, the blocking relationship between vehicles will change with the steering angle, as shown in FIG. 6. In the figure, the steering angle of vehicle 0 varies from $\delta_0^{f''}$ to $\delta_0^f$ (assuming that the deflection angle is positive when the vehicle turns left and negative when turning right). When the steering angle range is within $(\delta_0^{f''}, \delta_0^{f'})$ vehicle 0 is blocked by vehicle 2; when the steering angle range is within $(\delta_0^{f''}, \delta_0^{f})$, vehicle 0 is blocked by vehicle 1. Therefore, the blockage relation related to the steering angle is shown in FIG. 6-*b*. Each node in the graph represents a vehicle, and each edge represents the blockage relationship, but each edge is given a certain interval, which means that when the steering angle is in this interval, the vehicle blockage relationship is established. For example, the interval value assigned to the edge from node 0 to node 2 is $(\delta_0^{f''}, \delta_0^{f'})$, which means that only if the front wheels of vehicle 0 are within this range, vehicle 0 and vehicle 2 will form a blockage relationship.

The extend blockage graph is constructed by a numerical solution, as shown in FIG. 5. The steering angle of vehicle 0 is discretized. When the trajectory formed by a specific steering angle just surrounds the vehicle 1, the two angles are within the steering angle range where the blocking relationship is established, for example $\delta_0^{f'}$ and $\delta_0^{f''}$ as shown in FIG. 5.

The detection of a strong traffic deadlock needs to take into account all values of steering angles of each CAV, and different steering angles correspond to different blockage graphs. Therefore, according to the steering angle range of each CAV, the extended blockage graph is firstly decomposed into several sub-blockage graphs, that is $\overrightarrow{BG}(\mathfrak{N}, \mathfrak{E}|\delta^f)=\{BG(\mathfrak{N}, \mathfrak{E})\}$, the difference between each sub-blockage graph $BG(\mathfrak{N}, \mathfrak{E})$ and the blockage graph $BG(\mathfrak{N}, \mathfrak{E})$ of a weak traffic deadlock lies in that the value range of the steering angle is assigned to the former's edge. See FIG. 6 for the decomposition method. Once a node points to several downstream nodes, and the ranges of these edges are inconsistent, it is necessary to split the relation into several sub-blockage graphs. For example, in the graph, the values of the edges pointing to 1 and 2 from node 0 are different, and the interval of edge 0→2 is a part of the interval of 0→1, so these edges need to be split into two blockage graphs (FIG. 6-*c* and FIG. 6-*d*). In a single blockage graph after splitting, the assignment of edges from any node is exactly the same (that is, the range of the steering angle of the vehicle is the same).

After splitting, a strong traffic deadlock detection needs to detect every sub-blockage graph. For a specific sub-blockage graph, when the front wheel steering angles of all CAVs make the intersection in a deadlock state, the sub-blockage graph is in a deadlock state; when all the split sub-blockage graphs are in a deadlock state, the strong traffic deadlock holds true. Once a sub-blockage graph is not in a traffic deadlock state, it means that a CAV can select a certain front wheel steering angle, so that the traffic state at the intersection can be released from the deadlock state. In addition, once there is no cycle in a sub-blockage graph after splitting, it can be judged immediately that the blockage graph is not in a deadlock state, so the whole intersection does not meet the strong traffic deadlock condition.

Without losing generality, it is assumed that for vehicle j, the steering angle needs to be cut into several intervals with the number of intervals being$]\delta_j^f[$, and for the mth interval, it is expressed as $(\underline{\delta_{j,m}}^f, \overline{\delta_{j,m}}^f)$, $m \in \{1, 2, \ldots ]\delta_j^f[\}$, therefore, the total number of sub-blockage graphs is $\Pi_j]\delta_j^f[$. The premise of a strong traffic deadlock is that these sub-blockage graphs are in deadlock state.

The deadlock identification method for a specific sub-blockage graph is now discussed. It is assumed that for a vehicle j in a certain cycle $\mathbb{L}_k$ in the sub-blockage graph (its corresponding symbols all carry subscript j for distinguishing), its steering angle range is $(\underline{\delta_{j,m_j}}^f, \overline{\delta_{j,m_j}}^f)$. It is discretized with a discrete step of $\Delta\delta^f$. After discretization, the steering angle of vehicle j has only several limited options, which are expressed as $\delta_{j,m_j,1}^f$, $\delta_{j,m_j,2}^f$, $\delta_{j,m_j,3}^f$ . . . . Assuming that the traffic deadlock of this sub-blockage graph is detected from vehicle 1. When the steering angle of vehicle 2 (the downstream vehicle of vehicle 1) is $\delta_{2,m_2,v}^f$, $v \in \{1, 2, \ldots\}$, the steering angle of vehicle 1 is $\delta_{1,m_1}{}^{,u}$, $u \in \{1, 2, \ldots\}$ and the travelling distance is $l_1$, the distance that vehicle 2 needs to go forward is expressed as:

$$l_2=\mathcal{K}_{1\to 2}(l_1\delta_{1,m_1u}{}^f,\delta_{2,m_2,v}{}^f) \tag{20}$$

This function can be obtained by a method similar to the function $l_1=\mathcal{L}_{0\to 1}(l_0)$ under a weak traffic deadlock, so it will not be described again.

The evasion distance of vehicle 1 depends on the steering angle of vehicle 1 and vehicle 2. When the steering angle of the vehicle 2 is fixed at $\delta_{2,m_2,v}^f$, different steering angles of the vehicle 1 require different distances for the vehicle 2 to travel to release vehicle 1. If the smallest of these distances satisfies the deadlock condition, then other distances cannot unlock the deadlock. Therefore, in the process of traffic deadlock detection, when the steering angle of the vehicle 2 is $\delta_{2,m_2,v}^f$, only the following minimum values need to be considered:

$$\min_{\delta_{1,m_1,u}^f} l_2 = \min_{\delta_{1,m_1,u}^f} \mathcal{K}_{1\to 2}\left(l_1, \delta_{1,m_1,u}^f, \delta_{2,m_2,v}^f\right) \tag{21}$$

Now consider the vehicle downstream of the vehicle 2, that is, the vehicle 3. When the steering angle of the vehicle 3 is fixed at $\delta_{3,m_3,w}^f$, the travelling distance of the vehicle 3 is:

$$l_3 = \mathcal{K}_{2\to 3}\left(l_2, \delta_{2,m_2,v}^f, \delta_{3,m_3,w}^f\right) = \mathcal{K}_{2\to 3}\left(\min_{\delta_{1,m_1,u}^f} \mathcal{K}_{1\to 2}\left(l_1, \delta_{1,m_1,u}^f, \delta_{2,m_2,v}^f\right), \delta_{2,m_2,v}^f, \delta_{3,m_3,w}^f\right) \tag{17}$$

Similar to the discussion of the travelling distance of the vehicle 2, only the minimum value in the case of fixed $\delta_{3,m_3,w}^f$ needs to be considered, that is:

$$\min_{\delta_{2,m_2,v}^f} l_3 = \min_{\delta_{2,m_2,v}^f} \mathcal{K}_{2\to 3}\left(\min_{\delta_{1,m_1,u}^f} \mathcal{K}_{1\to 2}\left(l_1, \delta_{1,m_1,u}^f, \delta_{2,m_2,v}^f\right), \delta_{2,m_2,v}^f, \delta_{3,m_3,w}^f\right) \tag{23}$$

Therefore, for the convenience of discussing the problem, consider the minimum travelling distance function from vehicle j to vehicle s:

$$\mathcal{W}_{j\rightsquigarrow s,\mathbb{L}_k}\left(x, \delta_j^f, \delta_s^f\right) = \min_{\delta_{s-1}^f, \ldots \delta_{j+1}^f} \mathcal{K}_{s-1\to s}\left(\mathcal{K}_{s-2\to s-1}\left(\ldots \mathcal{K}_{j\to j+1}\left(x, \delta_j^f, \delta_{j+1}^f\right) \ldots\right), \delta_{s-1}^f, \delta_s^f\right) \tag{18}$$

In the above formula, $\mathcal{W}_{j\rightsquigarrow s,\mathbb{L}_k}(x, \delta_j^f, \delta_s^f)$ indicates the shortest distance that the vehicle s needs to travel using the steering angle $\delta_s^f$ when the vehicle j travels x using angle $\delta_j^f$, regardless of the steering angles of other vehicles (vehicles j+1, j+2, . . . s−1) in the path j→s. $\mathcal{W}_{j\rightsquigarrow s,\mathbb{L}_k}(x, \delta_j^f, \delta_s^f)$ meets the following recursive condition:

$$\mathcal{W}_{j\rightsquigarrow s+1,\mathbb{L}_k}\left(x, \delta_j^f, \delta_{s+1}^f\right) = \min_{\delta_s^f} \mathcal{K}_{s\to s+1}\left(\mathcal{W}_{j\rightsquigarrow s,\mathbb{L}_k}\left(x, \delta_j^f, \delta_s^f\right), \delta_s^f, \delta_{s+1}^f\right) \tag{25}$$

According to formula (25), the travelling distance can be analyzed recursively from vehicle j along the cycle and finally come to vehicle j ifself. When the following conditions are met, the traffic deadlock on $\mathbb{L}$ exists:

$$\mathcal{W}_{j\rightsquigarrow j,\mathbb{L}_k}(\overline{l_{j\to j+1}}|_{\delta_j^f,\delta_{j+1}^f},\delta_j^f,\delta_j^f)\geq \widehat{l_{j\to j+1}}|_{\delta_j^f}\forall\delta_j^f,\delta_{j+1}^f \tag{19}$$

The physical meaning expressed on the left side of the inequality is the distance that the vehicle j needs to travel when the evasion distance is $\overline{l_{j\to j+1}}|_{\delta_j^f,\ \delta_{j+1}^f}$, and the right side of the inequality represents the current permitted travelling distance. If the inequality holds, it means that the escape propagation distance of the vehicle is greater than the distance it can provide, so the traffic deadlock is formed on the cycle $\mathbb{L}$.

When the steering angle is variable, the traffic deadlock detection flow of a single blockage graph is carried out according to the above thought and formula (26). The detection process is shown in the following table.

TABLE 2

| The EDP (escape distance propagation) of the strong deadlock detection | |
|---|---|
| Input | The information of all vehicles. It includes the information of all CAVs and HDVs. The information of CAV are speed and front steering angle, while the information of the HDVs are real-time coordinates |
| output | Strong deadlock set $\mathcal{D}$<br>The vehicles within deadlock |
| | Initialize deadlocks set $\mathcal{D}=\emptyset$ |
| | Estimate the speed and the steering angle of all HDVs; |
| | Construct the $\overrightarrow{\mathbf{BG}}(\mathfrak{N},\mathfrak{E}\,\|\,\delta^f)$; |
| | Split the $\overrightarrow{\mathbf{BG}}(\mathfrak{N},\mathfrak{E}\,\|\,\delta^f)$ into many $BG(\mathfrak{N},\mathfrak{E})$ |
| | FOR $BG(\mathfrak{N},\mathfrak{E})\in\overrightarrow{\mathbf{BG}}(\mathfrak{N},\mathfrak{E}\,\|\,\delta^f)$ |
| | ░░ IF loops exist in $BG(\mathfrak{N},\mathfrak{E})$: |
| | ░░░░ Identify all loops in $BG(\mathfrak{N},\mathfrak{E})$ as set $\mathcal{L}=\{\mathbb{L}_k\}$; |
| | ░░░░ FOR each loop $\mathbb{L}_k$ in $\mathcal{L}$: |
| | ░░░░░░ Randomly select vehicle (without loss of generality, assume this vehicle is 1); |
| | ░░░░░░ Get the steering angles values set $\{\delta_{1,m_1,\cdot}^f\}$ and $\{\delta_{1,m_2,\cdot}^f\}$: |
| | ░░░░░░ FOR $\delta_{1,m_1,i}^f$ in $\{\delta_{1,m_1,\cdot}^f\}$ and $\delta_{1,m_2,k}^f$ in $\{\delta_{2,m_2,\cdot}^f\}$: |
| | ░░░░░░░░ Compute $\widehat{l_{1\to 2}}\|_{\delta_{i,m_1,i}^f}$ (i.e. permitted travelling distance); |
| | ░░░░░░░░ Compute $\overline{l_{1\to 2}}\|_{\delta_{1,m_1,i}^f,\delta_{2,m_2,k}^f}$ distance); |
| | ░░░░░░ FOR $\delta_{2,m_2,K}^f$ in $\{\delta_{2,m_2,\cdot}^f\}$: |
| | ░░░░░░░░ $\mathcal{W}_{1\rightsquigarrow 2,\mathbb{L}_k}\left(\overline{l_{1\to 2}}\|_{\delta_{1,m_1,i}^f,\ \delta_{2,m_2,k}^f}\right)=$ $\mathcal{K}_{1\to 2}\left(\overline{l_{1\to 2}}\|_{\delta_{1,m_1,i}^f,\ \delta_{2,m_2,k}^f},\ \delta_{1,m_1,u}^f,\ \delta_{2,m_2,v}^f\right)$ |
| | ░░░░░░ FOR $j=\{3,4,\ldots\ldots 1\}\in\mathbb{L}_k$ |
| | ░░░░░░░░ FOR $\delta_{j,m_j,k}^f$ in $\{\delta_{j,m_j,\cdot}^f\}$ and $\delta_{1,m_1,i}^f$ in $\{\delta_{1,m_1,\cdot}^f\}$ and $\delta_{2,m_2,u}^f$ in $\{\delta_{2,m_2,\cdot}^f\}$ and $\delta_{j-1,m_{j-1},v}^f$ in $\{\delta_{j-1,m_{j-1},\cdot}^f\}$: |
| | ░░░░░░░░░░ $\mathcal{W}_{1\rightsquigarrow j,\mathbb{L}_k}\left(\overline{l_{1\to 2}}\|_{\delta_{1,m_1,i}^f,\ \delta_{2,m_2,u}^f},\ \delta_{1,m_1,i}^f,\ \delta_{2,m_j,k}^f\right)=$ $\min_{\delta_{j-1,m_{j-1},v}}\mathcal{K}_{j-1\to j}\left(\mathcal{W}_{1\rightsquigarrow j-1,\mathbb{L}_k}\left(\overline{l_{1\to 2}}\|_{\delta_{1,m_1,i}^f,\ \delta_{2,m_2,u}^f},\ \delta_j^f,\ \delta_s^f\right),\ \delta_s^f,\ \delta_{j,m_j,k}^f\right)$ |
| | ░░░░░░░░░░ Compute $\widehat{l_{l\to l+1}}\|_{\delta_{j,m_j,k}^f}$ |
| | ░░░░░░░░░░ IF $\mathcal{W}_{1\rightsquigarrow j,\mathbb{L}_k}\left(\overline{l_{1\to 2}}\|_{\delta_{1,m_1,i}^f,\ \delta_{2,m_2,u}^f},\ \delta_{1,m_1,i}^f,\ \delta_{2,m_j,k}^f\right)<\widehat{l_{l\to l+1}}\|_{\delta_{j,m_j,k}^f}$ |
| | ░░░░░░░░░░░░░ RETURN "NO STRONG DEADLOCK |
| | ░░░░░░ IF $\mathcal{W}_{1\rightsquigarrow j,\mathbb{L}_k}\left(\overline{l_{1\to 2}}\|_{\delta_{1,m_1,i}^f,\ \delta_{2,m_2,k}^f},\ \delta_{1,m_1,i}^f,\ \delta_{2,m_1,i}^f\right)<$ |

TABLE 2-continued

| The EDP (escape distance propagation) of the strong deadlock detection | |
|---|---|
| 47 | $\widehat{l_{1\to 2}}\vert_{\delta^{f}_{1,m_1,i}}, \forall\ \delta_{1,m_1,i}, \delta_{2,m_2,k}$ |
| 48 | |
| 49 | ▒▒▒▒▒▒▒▒ RETURN "NO STRONG DEADLOCK" |
| 50 | ▒▒ ELSE: |
| 51 | |
| 52 | ▒▒▒ RETURN "NO STRONG DEADLOCK" |
| 53 | RETURN "STRONG DRADLOCK"; |

In the above flow, line 30 indicates that there is a certain vehicle in the cycle $\mathbb{L}$, and the permitted travelling distance of the vehicle is greater than the distance of the deadlock condition. Therefore, the vehicle can make the intersection get out of deadlock by traveling a certain distance, so there is no STRONG DEADLOCK; line 34 indicates that the blockage graph BG($\mathfrak{R}$, $\mathfrak{E}$) does not meet the deadlock condition, so there is no strong traffic deadlock at the intersection; line 36 indicates that there is no cycle in a blockage graph, so it can be directly concluded that there is no strong traffic deadlock; line 37 indicates that the conditions of "no strong traffic deadlock" are not valid, so the intersection is in a strong traffic deadlock state.

The above process assumes that the information (including coordinates and steering angle) of human driven vehicles (HDV) in the intersection can be obtained. However, in practice, only the real-time coordinates of the HDV can be obtained, but its steering angle cannot be obtained. Therefore, it is necessary to estimate the steering angle. The dynamic model of the HDV is the same as formula (1), and the state variable is z=[x, y, ψ]$^T$; the control variable is u=[v, $\delta_f$]$^T$; the observation variable is $$\begin{bmatrix} x \\ y \end{bmatrix},$$

that is, only the real-time coordinates of HDV can be observed. Therefore, the state equation and observation equation of the HDV are respectively:

$$\begin{cases} \dot{z} = \begin{bmatrix} \dot{x} \\ \dot{z} \\ \dot{\psi} \end{bmatrix} = f(z, u) + \Upsilon = f\left(\begin{bmatrix} x \\ y \\ \psi \end{bmatrix}, \begin{bmatrix} v \\ \delta_f \end{bmatrix}\right) + \Upsilon & (a) \\ w = \begin{bmatrix} x \\ y \end{bmatrix} = \begin{bmatrix} 1 & 0 & 0 \\ 0 & 1 & 0 \end{bmatrix}\begin{bmatrix} x \\ y \\ \psi \end{bmatrix} + \Gamma & (b) \end{cases} \tag{20}$$

where, Υ indicates a state error, and its variance matrix is Q; Γ indicates an observation error, its variance matrix is R. The above state equation is nonlinear, linearize it around a reference point $z^R$ and a reference input $u^R$:

$$\dot{z} = f(z, u) = f(z^R, u^R) + \frac{\partial f}{\partial z}\bigg|_{z^R}(z - z^R) + \frac{\partial f}{\partial u}\bigg|_{u^R}(u - u^R) + \Upsilon + \text{high order term} \tag{21}$$

Jacobi matrix in the above formula is defined as:

$$\frac{\delta f}{\delta z}\bigg|_{z^R} = \begin{bmatrix} 0 & 0 & -v\sin\left(\psi + \arctan\left(\frac{\tan(\delta_f)}{2}\right)\right) \\ 0 & 0 & v\cos\left(\psi + \arctan\left(\frac{\tan(\delta_f)}{2}\right)\right) \\ 0 & 0 & 0 \end{bmatrix}; \tag{22}$$

$$\frac{\delta f}{\delta u}\bigg|_{u^R} = \begin{bmatrix} \cos\left(\psi + \arctan\left(\frac{\tan(\delta_f)}{2}\right)\right) & -\frac{v\left(\frac{1+\tan(\delta_f)^2}{2}\right)\sin\left(\psi + \arctan\left(\frac{\tan(\delta_f)}{2}\right)\right)}{1 + \frac{\tan(\delta_f)^2}{4}} \\ \sin\left(\psi + \arctan\left(\frac{\tan(\delta_f)}{2}\right)\right) & \frac{v\left(\frac{1+\tan(\delta_f)^2}{2}\right)\cos\left(\psi + \arctan\left(\frac{\tan(\delta_f)}{2}\right)\right)}{1 + \frac{\tan(\delta_f)^2}{4}} \\ 4\sqrt{1 + \frac{\tan(\delta_f)^2}{4}} & \frac{v(1 + \tan(\delta_f)^2)}{4\sqrt{1 + \frac{\tan(\delta_f)^2}{4}}} - \frac{2v(1 + \tan(\delta_f)^2)\tan(\delta_f)^2}{32\left(1 + \frac{\tan(\delta_f)^2}{4}\right)} \end{bmatrix}$$

The above formula is further discretized to get:

$$\begin{aligned} \dot{z} = f(z^R, u^R) + \frac{\partial f}{\partial z}\bigg|_{z^R}(z - z^R) + \frac{\partial f}{\partial u}\bigg|_{u^R}(u - u^R) + \Upsilon \Rightarrow z_{k+1} - z^R = \\ \Delta t \cdot f(z^R, u^R) + \Delta t \cdot E(z_{k+1} - z_R) + \Delta t \cdot F(u_{k+1} - u^R) + \Delta t \cdot \Upsilon \Rightarrow \\ (I - E)z_{k+1} - Fu_{k+1} = f(z_k, u_k) - \Delta t \cdot Ez_k - \Delta t \cdot Fu_k + \Delta t \cdot \Upsilon \Rightarrow \\ [I - \Delta t \cdot E \quad -\Delta t \cdot F]\begin{bmatrix} z_{k+1} \\ u_{k+1} \end{bmatrix} = [-\Delta t \cdot E \quad -\Delta t \cdot F]\begin{bmatrix} z_k \\ u_k \end{bmatrix} + \\ \Delta t \cdot f(z_k, u_k) + \Delta t \cdot \Upsilon \end{aligned} \tag{30}$$

For convenience of expression, the block matrix in the above formula is expressed with the following symbols:

$$G=[I-\Delta t \cdot E - \Delta t \cdot F];\ H=[-\Delta t \cdot E - \Delta t \cdot F] \tag{23}$$

Therefore, the following linear system is obtained:

$$G\begin{bmatrix} z_{k+1} \\ u_{k+1} \end{bmatrix} = H\begin{bmatrix} z_k \\ u_k \end{bmatrix} + \Delta t \cdot f(z_k, u_k) + \Delta t \cdot \Upsilon \tag{24}$$

In the above formula, $f(z_k, u_k)$ is the value of the function f at the point $(z_k, u_k)$, which can be regarded as constant. On the other hand, observation equation (27)-b can be reorganized as follows:

$$w = \begin{bmatrix} x \\ y \end{bmatrix} = \begin{bmatrix} 1 & 0 & 0 \\ 0 & 1 & 0 \end{bmatrix} \begin{bmatrix} x \\ y \\ \psi \end{bmatrix} + \Gamma \Rightarrow \tag{25}$$

$$w = \begin{bmatrix} x \\ y \end{bmatrix} = \begin{bmatrix} 1 & 0 & 0 & 0 & 0 \\ 0 & 1 & 0 & 0 & 0 \end{bmatrix} \begin{bmatrix} x \\ y \\ \psi \\ v \\ \delta_f \end{bmatrix} = M \begin{bmatrix} x \\ y \\ \psi \\ v \\ \delta_f \end{bmatrix} + \Gamma$$

Therefore, the state equation is linearized and discretized, the observation equation is reorganized, and they are put together to get a new linear system:

$$\begin{cases} G\begin{bmatrix} z_{k+1} \\ u_{k+1} \end{bmatrix} = H\begin{bmatrix} z_k \\ u_k \end{bmatrix} + f(z_k, u_k) + \Delta t \cdot \Upsilon & (a) \\ w = M\begin{bmatrix} z_k \\ u_k \end{bmatrix} + \Gamma & (b) \end{cases} \tag{26}$$

In the above new linear system, the state variable is $$\begin{bmatrix} z_{k+1} \\ u_{k+1} \end{bmatrix}.$$

The inferred value is expressed as:

$$\begin{bmatrix} z_{k+1}^* \\ u_{k+1}^* \end{bmatrix} = P_{k+1|k+1}\left(G^T\left(\Delta t \cdot Q + HP_{k|k}H^T\right)^{-1} H\begin{bmatrix} z_k^* \\ u_k^* \end{bmatrix} + M^T R^{-1} w_{k+1}\right)\begin{bmatrix} z_k^* \\ u_k^* \end{bmatrix} \tag{35}$$

$$\begin{bmatrix} z_k^* \\ u_k^* \end{bmatrix}$$

(is the estimation for $$\begin{bmatrix} z_k \\ u_k \end{bmatrix}$$

based on the information up to the k time step; $P_{k|k}$, is calculated as:

$$P_{k+1|5+1} = (G^T(\Delta t \cdot Q + HP_{k|k}H^T)^{-1}G + M^T R^{-1} M)^{-1} \tag{27}$$

Therefore, according to formula (35), the state $u_k$ of the k time step can be inferred, and $u_k$ contains a steering angle, so the steering angle of the HDV can be obtained by formula (35).

What is claimed is:

1. An intersection deadlock identification method for a mixed flow of autonomous vehicles, comprising the following steps: firstly, detecting the existence of a weak traffic deadlock, wherein if there is no weak traffic deadlock, there exists no deadlock at an intersection; and when there exists a weak traffic deadlock, then detecting the existence of a strong traffic deadlock, wherein if there exists a strong traffic deadlock, the intersection has a strong traffic deadlock, and if there exists no strong traffic deadlock, the intersection has a weak traffic deadlock; wherein the weak traffic deadlock is determined under the condition that all CAV front wheel steering angles are fixed, a determining criteria being an escape propagation distance of a vehicle arbitrarily selected is greater than a current permitted distance of the vehicle, and the strong traffic deadlock is determined under the condition that all CAV front wheel steering angles are variable, a determining criteria being for any possible steering angle of every CAV in the intersection an escape propagation distance of a vehicle arbitrarily selected is greater than a current permitted distance of the vehicle.

2. The intersection deadlock identification method for a mixed flow of autonomous vehicles according to claim 1, wherein the method for detecting the existence of a weak traffic deadlock is as follows:

1) firstly, obtaining two-dimensional coordinates, speeds and front wheel steering angle information of all vehicles in an intersection, wherein the front wheel steering angle of a human driven vehicle is estimated by an extended Kalman filtering method;
2) representing vehicles by nodes, with each node representing a vehicle, and representing the blocking relationship of the vehicles by edges with arrows, wherein arrows point from blocked vehicles to blocking vehicles to construct a blockage graph of all vehicles in the intersection;
3) when there is no cycle in the blockage graph, the cycle being a ring structure, determining that there is no weak deadlock at the intersection, and when there is a cycle in the blockage graph, traversing all ring structures, and performing the following weak deadlock identification process:
(1) selecting arbitrarily a certain vehicle in the ring structure as a starting vehicle for deadlock detection, and calculating an evasion distance and a current permitted distance of the starting vehicle;
(2) calculating, on the premise that the starting vehicle can move forward by the evasion distance, along an arrow direction in the ring structure, a minimum distance that each vehicle needs to move forward in order to meet the above premise, namely an escape propagation distance, and finally calculating the escape propagation distance of the starting vehicle;
(3) determining that there is a weak traffic deadlock and the starting vehicle is the vehicle causing the traffic deadlock when the escape propagation distance of the starting vehicle is greater than the current permitted distance of the vehicle.

3. The intersection deadlock identification method for a mixed flow of autonomous vehicles according to claim 1, wherein the method for detecting the existence of a strong traffic deadlock is as follows:

1) representing vehicles by nodes, with each node representing a vehicle, and representing the blocking relationship of the vehicles by edges with arrows, wherein arrows point from blocked vehicles to blocking vehicles, and each edge is assigned according to a steering angle range corresponding to blocked vehicles, thereby constructing an extended blockage graph of the vehicles in intersections;
2) when the nodes in the extended blockage graph have multiple adjacent downstream nodes, decomposing the extended blockage graph to obtain multiple sub-blockage graphs;
3) detecting the existence of a deadlock in each sub-blockage graph, wherein if a traffic deadlock exists in any sub-blockage graph, then a strong traffic deadlock exists, and it is determined that the intersection has a strong traffic deadlock, and wherein if a certain sub-blockage graph is not in a deadlock state, there is no strong traffic deadlock, and it is determined that the intersection only has a weak traffic deadlock.

4. The intersection deadlock identification method for a mixed flow of autonomous vehicles according to claim 3, wherein the extended blockage graph is decomposed so that assignments of various edges from a certain node in each decomposed sub-blockage graph are consistent, that is, when the steering angle of the vehicle corresponding to the node is within the assigned interval, the vehicle will be blocked by the vehicles corresponding to all adjacent downstream nodes of the node in the graph.

5. The intersection deadlock identification method for a mixed flow of autonomous vehicles according to claim 3, wherein the method for detecting the existence of a deadlock in the sub-blockage graph is as follows:

if there is no cycle, namely ring structure in the sub-blockage graph, determining that there is no deadlock in the sub-blockage graph; otherwise, traversing each ring structure, and calculating, for any ring structure, the escape propagation distance of any adjacent vehicle according to a restriction function $l_j=\mathcal{K}_{i\to j}(l_i, \delta_i^f, \delta_j^f)$, wherein the function $l_j=\mathcal{K}_{i\to j}(l_i, \delta_i^f, \delta_j^f)$ indicates that when a vehicle i is blocked by a vehicle j, and the steering angles of the vehicle i and the vehicle j are respectively $\delta_i^f$ and $\delta_j^f$, if the travelling distance of the vehicle i is $l_i$, then the travelling distance of the vehicle j is $l_j$;

if, for the vehicle j in any cycle $\mathbb{L}_k$ in the sub-blockage graph:

$$\mathcal{W}_{j\rightsquigarrow j,\mathbb{L}_k}\left(\overline{l_{j\to j+1}}|_{\delta_j^f,\delta_{j+1}^f}, \delta_j^f, \delta_j^f\right) \geq \text{[illegible]}\ \forall\, \delta_j^f, \delta_{j+1}^f,$$

where $\mathcal{W}_{j\rightsquigarrow j,\mathbb{L}_k}(\overline{l_{j\to j+1}}|_{\delta_j^f, \delta_{j+1}^f}, \delta_j^f, \delta_j^f)$ indicates a distance required for the vehicle j to move forward for propagating the evasion distance $\overline{l_{j\to j+1}}|_{\delta_j^f,\delta_j^f}$ of the vehicle j to the vehicle itself via the cycle $\mathbb{L}_k$ in a case that the front wheel steering angle of the vehicle j is $\delta_j^f$ and the front wheel steering angle of a vehicle j+1 is $\delta_{j+1}^f$, when the distance is greater than the current distance that can be travelled by the vehicle j, then determining that there is a deadlock in the intersection.

* * * * *